United States Patent
Kimura et al.

(10) Patent No.: US 8,423,202 B2
(45) Date of Patent: Apr. 16, 2013

(54) VEHICLE BEHAVIOR CONTROL APPARATUS AND VEHICLE BEHAVIOR CONTROL METHOD

(75) Inventors: Yukihide Kimura, Gotenba (JP); Ryota Osumi, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 841 days.

(21) Appl. No.: 12/053,084

(22) Filed: Mar. 21, 2008

(65) Prior Publication Data

US 2008/0234877 A1  Sep. 25, 2008

(30) Foreign Application Priority Data

Mar. 22, 2007  (JP) .................. 2007-075458

(51) Int. Cl.
| | |
|---|---|
| B60K 31/12 | (2006.01) |
| B60K 31/02 | (2006.01) |
| G05D 1/02 | (2006.01) |
| G05D 3/00 | (2006.01) |
| G06F 17/00 | (2006.01) |

(52) U.S. Cl.
USPC ...... 701/1; 701/22; 701/67; 701/70; 180/172; 180/65.1; 180/65.21

(58) Field of Classification Search ............ 701/1, 22, 701/36, 37, 38, 41, 67, 70–72; 180/170, 180/172, 178, 7.1, 65.1, 65.21; 74/5 R, 5.22, 74/5.34, 5.4, 5.95; 244/164–166
See application file for complete search history.

(56) References Cited

U.S. PATENT DOCUMENTS

| | | | | |
|---|---|---|---|---|
| 5,313,850 | A | * | 5/1994 | Finvold et al. ............... 74/5.9 |
| 5,839,386 | A | * | 11/1998 | Frieling et al. ............... 114/121 |
| 2001/0032522 | A1 | * | 10/2001 | Davis, Jr. .................... 74/84 S |
| 2005/0045398 | A1 | * | 3/2005 | Suzuki ........................ 180/209 |

FOREIGN PATENT DOCUMENTS

| | | |
|---|---|---|
| JP | 5-13878 | 2/1993 |
| JP | 10-281050 | 10/1998 |
| JP | 2002-68063 | 3/2002 |
| JP | 2004-42760 | 2/2004 |
| JP | 2004-82903 | 3/2004 |
| JP | 2004-343871 | 12/2004 |
| JP | 2005-80902 | 3/2005 |

* cited by examiner

*Primary Examiner* — Thomas Tarcza
*Assistant Examiner* — Edward Pipala
(74) *Attorney, Agent, or Firm* — Oblon, Spivak, McClelland, Maier & Neustadt, L.L.P.

(57) ABSTRACT

A vehicle behavior control apparatus that generates a gyro moment based on the behavior of the vehicle includes i) a gyro which has a rotating body that is rotatably supported on a rotating shaft and a rotating body rotating portion that rotates the rotating body, ii) a vehicle speed detecting portion that detects the vehicle speed of the vehicle, and iii) a controller that changes the centrifugal force generated in the rotating body based on the detected vehicle speed.

18 Claims, 6 Drawing Sheets

VEHICLE BEHAVIOR CONTROL APPARATUS AND VEHICLE BEHAVIOR CONTROL METHOD

INCORPORATION BY REFERENCE

The disclosure of Japanese Patent Application No. 2007-75458 filed on Mar. 22, 2007, including the specification, drawings and abstract is incorporated herein by reference in its entirety.

BACKGROUND OF THE INVENTION

1. Field of the Invention

The invention relates to a control apparatus and method that controls vehicle behavior.

2. Description of the Related Art

Japanese Utility Model Application Publication No. 5-13878 (JP-U-5-13878) and Japanese Patent Application Publication No. 2005-80902 (JP-A-2005-80902), for example, propose vehicle behavior control apparatuses that control the behavior of a vehicle in at least one rotational direction, i.e., the yaw direction, the roll direction, and the pitch direction, of the vehicle using a gyro-moment. The vehicle behavior control apparatus (in a vehicle with a flywheel) described in JP-U-5-13878 includes a flywheel that rotates about a horizontal axis in the length direction of the vehicle, first driving means for rotatably driving the flywheel about that horizontal axis, i.e., in the roll direction, and second driving means for rotatably driving the flywheel about a horizontal axis in the width direction of the vehicle, i.e., in the pitch direction.

With the vehicle behavior control apparatus described in JP-U-5-13878, a gyro-moment in the yaw direction, i.e., about a vertical axis in the height direction of the vehicle, is generated by rotating the flywheel in the pitch direction using the second driving means while rotating the flywheel in the roll direction using the first driving means. Accordingly, the control apparatus controls the behavior of the vehicle in the yaw direction, such as understeer and oversteer, by applying a gyro-moment generated in the yaw direction to the vehicle.

Also, the vehicle behavior control apparatus in JP-A-2005-80902 includes a flywheel that rotates about a vertical axis in the height direction of the vehicle, first driving means for rotatably driving the flywheel about that vertical axis, i.e., in the yaw direction, and second driving means for rotatably driving the flywheel about a horizontal axis in the length direction of the vehicle, i.e., in the roll direction. This control apparatus generates a gyro-moment about a horizontal axis in the width direction of the vehicle, i.e., in the pitch direction. Accordingly, the control apparatus controls the behavior of the vehicle in the pitch direction, such as nose dive and tail squat, by applying a gyro-moment generated in the pitch direction to the vehicle.

Noise, i.e., road noise and the like, increases as the vehicle speed increases. The noise from the rotation of a rotating body such as a flywheel increases as the rotation speed of the rotating body increases. Accordingly, even if the vehicle is traveling at a low speed such that the amount of road noise and the like is low, if the rotating body is rotating at high speed, the noise generated by that rotation may be relatively loud. However, neither JP-U-5-13878 nor JP-A-2005-80902 makes any mention of performing vehicle behavior control taking noise into account.

Further, the behavior of the vehicle in a rotational direction typically changes more quickly as the vehicle speed increases. A vehicle moves, turns, and stops using frictional force generated between the road surface and the tires, i.e., using the gripping force of the tires. Here, the gripping force of the tires is nonlinear so the behavior of the vehicle in a rotational direction may change suddenly from an increase in vehicle speed. Therefore, in order to deal with an increase in the rate of change, or a sudden change, in vehicle behavior that accompanies an increase in vehicle speed, the control response to the behavior of the vehicle in a rotational direction must be improved. However, neither JP-U-5-13878 nor JP-A-2005-80902 makes any mention of controlling the rotation state taking control response into account.

SUMMARY OF THE INVENTION

This invention thus provides a vehicle behavior control apparatus and a vehicle behavior control method that aim to suppress noise and/or improve control response.

A first aspect of the invention provides a vehicle behavior control apparatus that generates a gyro moment based on the behavior of the vehicle. This vehicle behavior control apparatus is provided with i) a gyro that includes a rotating body which is rotatably supported on a first rotating shaft, and a rotating body rotating portion that rotates the rotating body, ii) a vehicle speed detecting portion that detects a vehicle speed of the vehicle; and iii) a controller that changes centrifugal force generated in the rotating body based on the detected vehicle speed.

The vehicle behavior control apparatus may also be provided with a gimbal that includes a gyro rotational support portion that rotatably supports the gyro on a second rotating shaft that is orthogonal to the first rotating shaft of the rotating body, and a gyro rotating portion that rotates the gyro. Also, the controller may increase the centrifugal force generated in the rotating body as the detected vehicle speed increases.

In the foregoing vehicle behavior control apparatus, the controller may include a rotating body calculating portion that calculates the rotation speed of the rotating body based on the vehicle speed, and a rotating body control portion that rotates the rotating body such that the rotation speed of the rotating body comes to match the rotation speed calculated by the rotating body calculating portion to change the centrifugal force.

According to the first aspect of the invention, the centrifugal force generated in the rotating body is increased based on the detected vehicle speed. For example, the centrifugal force generated in the rotating body is increased by increasing the rotating body rotation speed as the vehicle speed increases. Here, the gyro moment is generated by rotating the rotating body using the rotating body rotating portion, and rotating the gyro in which centrifugal force is being generated on a different rotating shaft than the rotating shaft of the rotating body. The gyro moment is proportional to the product of the centrifugal force of the rotating body (i.e., the rotation speed of the rotating body) and the rotation speed of the gyro. That is, if the rotating body of the gyro is rotated by the rotating body rotating portion in advance, the gyro moment is generated by the gyro rotated in response to the vehicle behaving in a rotational direction that is different from the rotational direction in which the rotating body is rotating, or by rotating the gyro using the gyro rotating portion. Accordingly, by changing the centrifugal force of the rotating body in advance according to the vehicle speed, e.g., by increasing the centrifugal force by increasing the rotation speed of the rotating body as the vehicle speed increases, the required gyro moment can be generated without increasing the rotation speed of the rotating body according to the magnitude of the required gyro moment, in order to generate the gyro moment that is required for the behavior of the vehicle in the rotational direction. As a result, the control response of the vehicle behavior control in the rotational direction using the gyro moment improves.

Also, the gyro moment can be generated with a gyro rotation speed of the gyro and the centrifugal force of the rotating body. Therefore, by increasing the centrifugal force (i.e., the rotating body rotation speed) beforehand, the gyro rotation speed for rotating the gyro can be reduced with respect to the required gyro moment. Accordingly, the amount that the gyro rotating portion is driven in order to generate the required gyro moment can be reduced. Thus, a gyro moment can be generated that follows the required gyro moment that suddenly changes due to a sudden change in vehicle behavior in a rotational direction of the vehicle. As a result, the control response of the vehicle behavior control by the gyro moment improves.

Further, the rotating body rotation speed increases as the vehicle speed increases so the rotating body rotation speed when the vehicle is traveling in the low speed region is smaller than it is when the vehicle is traveling in the high speed region. Accordingly, noise produced by the rotation of the rotating body that is generated when the vehicle is traveling in the low speed region, such as the rotating noise of the rotating body itself or the driving noise of, for example, the motor that drives the rotating body, can be suppressed. As a result, noise from the rotation of the rotating body can be suppressed.

Moreover, the foregoing vehicle behavior control apparatus may also be provided with a steering amount detecting portion that detects a steering amount of the vehicle. Further, the rotating body rotating portion may increase the rotation speed of the rotating body to increase the centrifugal force as the detected steering amount increases.

Accordingly, the centrifugal force generated in the rotating body is increased by increasing the rotating body rotation speed in advance as the steering amount, e.g., the steering speed or the steering angle, increases. Therefore, even if the behavior of the vehicle suddenly changes in a rotational direction from the vehicle turning sharply, for example, the required gyro moment can be generated with a low gyro rotation speed. As a result, the control response to the behavior of the vehicle in the rotational direction when the vehicle turns sharply improves.

Further, in the foregoing vehicle behavior control apparatus, the controller may generate either i) a gyro moment that is constant regardless of an increase in the detected vehicle speed or ii) a gyro moment that decreases as the detected vehicle speed increases.

In this way, even if the vehicle speed increases, the gyro moment generated by the controller (and therefore the vehicle behavior control apparatus) will not increase. Therefore, even if the behavior of the vehicle in a rotational direction suddenly changes, e.g., even if the required gyro moment drastically decreases after a sudden change from what it was before the sudden change, the gyro moment that is generated will not increase. That is, the amount of gyro moment generated with respect to the amount of control to generate the required gyro moment becomes smaller, thus enabling the control to be more accurate.

Moreover, the foregoing vehicle behavior control apparatus may also be provided with a transfer rate changing portion that changes a transfer rate of gyro torque from the gyro rotating portion which rotates the gyro to the gyro.

Also, in the foregoing vehicle behavior control apparatus, the transfer rate changing portion may include at least either a clutch device or a damper device.

Accordingly, the transfer rate changing portion such as the clutch device or the damper device changes the transfer rate of the gyro torque that is transmitted to the gyro so the gyro moment that is generated can be controlled by the transfer rate changing portion. For example, generation of the gyro moment can be stopped by making the transfer rate 0. Accordingly, the controllability of vehicle behavior control by the gyro moment improves.

Moreover, the vehicle behavior control apparatus may also include a braking force applying portion that applies braking force to the rotating body in a direction opposite the direction in which the rotating body rotates.

The braking force applying portion applies braking force to the rotating body in the direction opposite the direction in which the rotating body rotates when decelerating the rotating body. Accordingly, the centrifugal force generated in the rotating body can be quickly reduced so the gyro moment that can be generated can be quickly reduced. As a result, controllability of the vehicle behavior control using the gyro moment improves.

Also, in the foregoing vehicle behavior control apparatus, the rotating body rotating portion may include a gyro motor/generator, and the vehicle behavior control apparatus may also be provided with a battery that is connected to the gyro motor/generator. Further, the gyro motor/generator may generate power when the rotating body decelerates and store that generated power in the battery.

Accordingly, the rotating body rotating portion is a gyro motor/generator. Therefore by making the rotating body rotating portion function as a generator when decelerating the rotating body, power can be generated while decelerating the rotating body. Accordingly, storing the generated power in the battery enables the energy obtained during deceleration of the rotating body to be used efficiently.

In the foregoing vehicle behavior control apparatus, the gyro motor/generator may also include a braking force applying portion that applies braking force to the rotating body in a direction opposite the direction in which the rotating body rotates.

Accordingly, the rotating body rotating portion is a gyro motor/generator. Therefore by making the rotating body rotating portion function as a generator when decelerating the rotating body, braking force can be applied in the direction opposite the direction in which the rotating body rotates and power can be generated. Accordingly, storing the generated power in the battery enables the energy obtained during deceleration of the rotating body to be used efficiently.

Moreover, the foregoing vehicle behavior control apparatus may also be provided with a regenerative brake device that performs regenerative braking to the vehicle, and at least some regenerative power that is generated when the regenerative braking is performed by the regenerative brake device may be used to drive the rotating body rotating portion.

Accordingly, at least some of the regenerative power generated while decelerating the vehicle is used to drive the rotating body rotating portion so regenerative braking can still be performed by the regenerative brake device even if the battery that stores the regenerative power is fully charged. Accordingly, during regenerative braking, braking performance of the vehicle can be improved even if the battery is fully charged.

A second aspect of the invention provides a vehicle behavior control method. This control method includes detecting a vehicle speed; calculating a rotation speed of a rotating body, which is part of a gyro and rotates on a first rotating shaft, such that the calculated rotating body rotation speed changes based on the detected vehicle speed; rotating the rotating body such that the rotation speed of the rotating body comes to match the calculated rotation speed; calculating a required gyro moment based on the detected vehicle speed; calculating, based on the calculated required gyro moment and the calculated rotation speed, a gyro rotation speed at which the gyro rotates on a second rotating shaft which is orthogonal to the first rotating shaft; and rotating the gyro rotates on the second rotating shaft such that the gyro rotation speed comes to match the calculated gyro rotation speed.

The vehicle behavior control apparatus according to the invention suppresses noise by controlling the rotation speed of a rotating body, as well as improves control response by controlling the centrifugal force generated in the rotating body.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

In the following description and the accompanying drawings, the present invention will be described in more detail in terms of example embodiments. Incidentally, the invention is not limited to the following example embodiments. Also, it is to be understood that the constituent elements in the following example embodiments are intended to also include those constituent elements which may easily occur to one skilled in the art and those constituent elements which are substantially similar to the constituent elements in the following example embodiments. In the example embodiments, a case is described in which a vehicle behavior control apparatus 1 controls the vehicle behavior in the roll direction, from among the rotational directions, i.e., in the yaw direction, the roll direction, and the pitch direction, of a vehicle 100. However, the invention is not limited to this.

Figure 1:
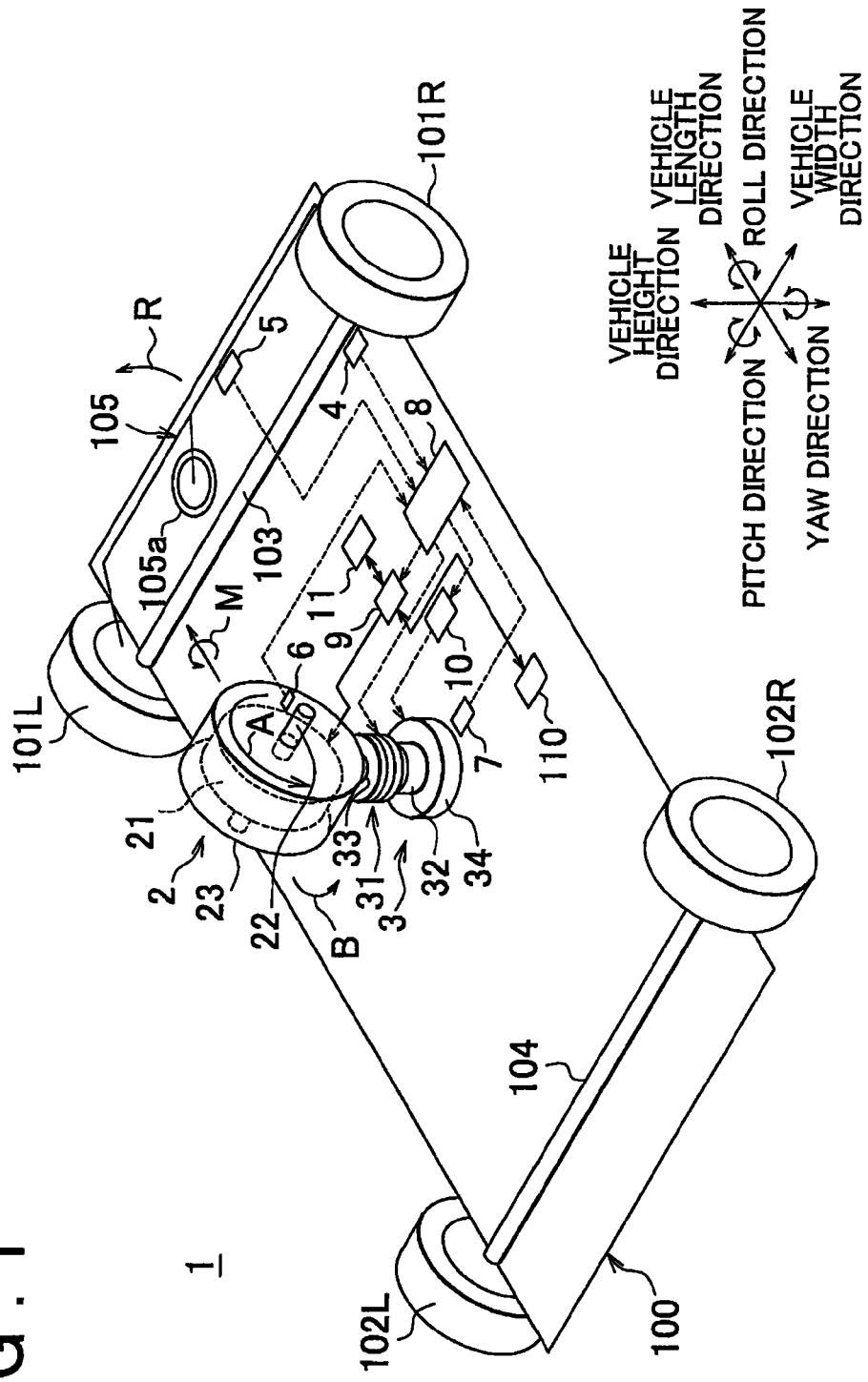
FIG. 1 is a view of an example structure of a vehicle behavior control apparatus according to an example embodiment of the invention.
Figure 2:
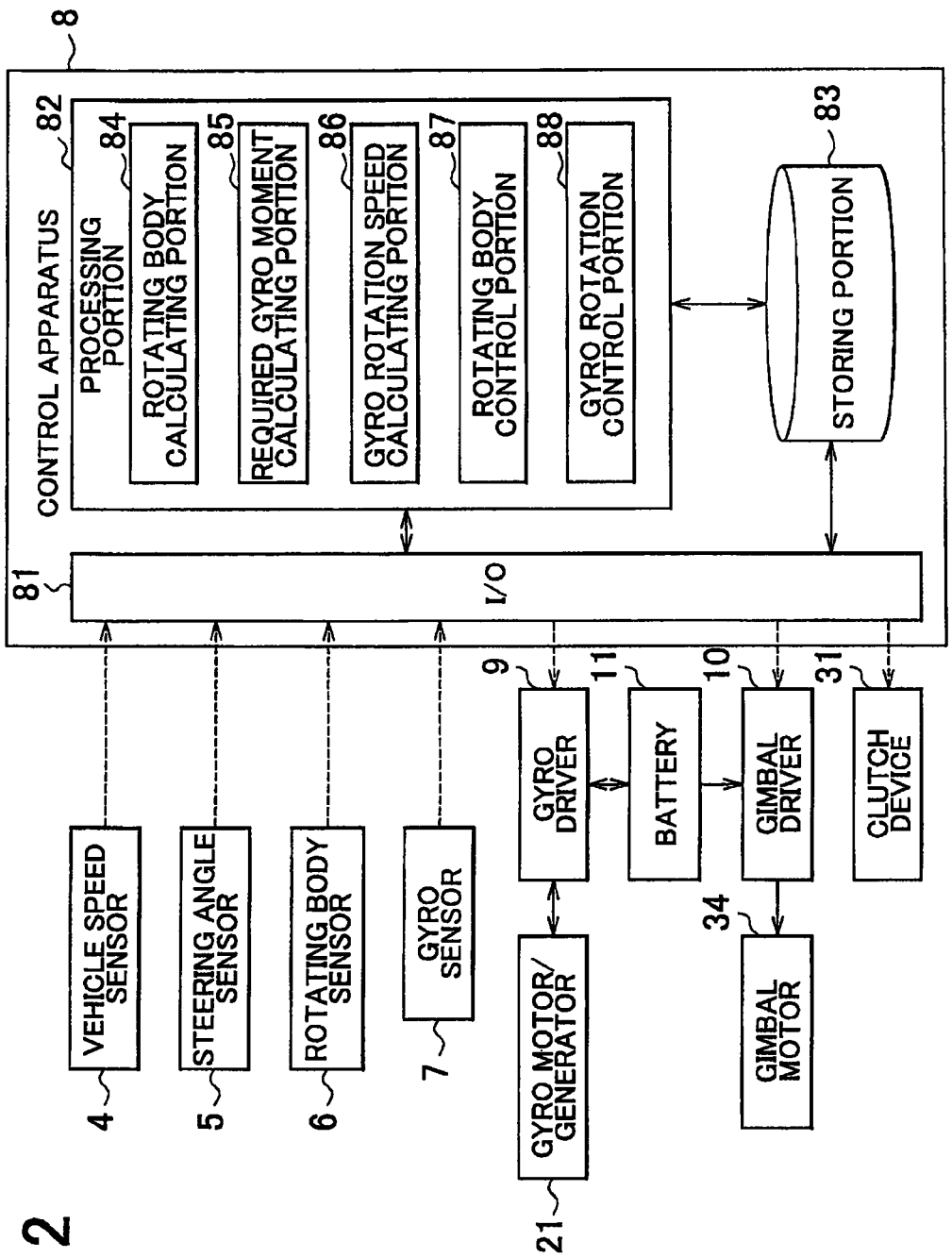
FIG. 2 is a block diagram showing an example structure of a control apparatus.

FIG. 1 is a view of an example structure of a vehicle behavior control apparatus according to an example embodiment of the invention, and FIG. 2 is a view of an example structure of a control apparatus. As shown in FIG. 1, the vehicle behavior control apparatus 1 is mounted in the vehicle 100.

Here, in the vehicle 100, left and right front wheels 101R, 101L are rotatably connected to one driveshaft 103, and left and right rear wheels 102R, 102L are rotatably connected to another driveshaft 104. Driving force from a driving source such as an internal combustion engine or an electric motor, not shown, is transmitted to at least one of the driveshafts 103 and 104. Accordingly, driving force from the driving source is transmitted to the left and right front wheels 101R and 101L via the driveshaft 103 and/or to the left and right rear wheels 102R and 102L via the driveshaft 104, and from there to the road. As a result, the vehicle 100 moves either forward or backward in the vehicle length direction. The vehicle 100 is also provided with a steering apparatus 105 that steers the left and right front wheels 101R and 101L. This steering apparatus 105 is steers the left and right front wheels 101R and 101L in response to a driver turning the steering wheel 105a.

The vehicle behavior control apparatus 1 generates a gyro moment M based on the behavior of the vehicle 100. The vehicle behavior control apparatus 1 includes a gyro 2, a gimbal 3, a vehicle speed sensor 4, a steering angle sensor 5, a rotating body sensor 6, a gyro sensor 7, a control apparatus 8, a gyro driver 9, a gimbal driver 10, and a battery 11.

The gyro 2 includes a rotating body 21, a rotating shaft 22, and a casing 23.

The rotating body 21 is rotatably supported with respect to the casing 23 by the rotating shaft 22. The casing 23 is connected to the vehicle 100 via the gimbal 3. Accordingly, the rotating body 21 is supported so that it can rotate on the rotating shaft 22 with respect to the vehicle 100. The radius and mass of the rotating body 21 are set in advance based on the required gyro moment M for behavior control of the vehicle 100. The rotating shaft 22 is arranged so that it basically extends in the vehicle width direction. Therefore, the rotating body 21 basically rotates in the pitch direction.

The rotating body 21 functions as a rotor. In contrast, the casing 23 is still with respect to the rotating body 21 which rotates, and thus functions as a stator. Accordingly, the gyro 2 is a single gyro motor/generator formed of a stator, a rotor, and the rotating shaft 22. The gyro 2 is connected to the control apparatus 8 via the gyro driver 9, and the control apparatus 8 controls (i.e., drives) the gyro 2 (i.e., the gyro motor/generator). Also, the gyro 2 is connected to the battery 11 also via the gyro driver 9. The drive control of the gyro 2 by the control apparatus 8 includes rotation drive control and power generating drive control. The rotation drive control controls the gyro 2 as a motor that rotates the rotating body 21 by the gyro driver 9 supplying power from the battery 11. The power generating drive control controls the gyro 2 as a generator that generates power by the gyro driver 9 applying braking force to the rotating body in the direction opposite the direction in which the rotating body 21 rotates. That is, the gyro 2 may be regarded as a gyro motor/generator of the invention, a rotating body rotating portion of the invention, and a braking force applying portion of the invention.

The gimbal 3 is formed of a clutch device 31, a damper device 32, a rotating shaft 33, and a gimbal motor 34.

The clutch device 31 changes the transfer rate of gyro torque from the gimbal motor 34 which rotates the gyro 2 to the gyro 2. That is, the clutch device 31 may be regarded as a transfer rate changing portion of the invention. The clutch device 31 is arranged between the gyro 2 and the gimbal motor 34. The clutch device 31 is switched between being on and off. When the clutch device 31 is on, it connects the gyro 2 to the gimbal motor 34. When the clutch device 31 is off, it disconnects the gyro 2 from the gimbal motor 34. The clutch device 31 is connected to the control apparatus 8 which controls the clutch device 31 on and off to switch between connecting and disconnecting the gyro 2 and the gimbal motor 34, and thus change the transfer rate of the gyro torque from the gimbal motor 34 that is transmitted to the gyro 2.

The damper device 32 also changes the transfer rate of the gyro torque from the gimbal motor 34 which rotates the gyro 2 to the gyro 2. That is, the damper device 32 may also be regarded as a transfer rate changing portion of the invention. The damper device 32 is arranged between the gyro 2 and the gimbal motor 34. The damper device 32 reduces the transfer rate of the gyro torque from the gimbal motor 34 that is transmitted to the gyro 2, and is formed of an elastic body or the like, for example.

The rotating shaft 33 may be regarded as a gyro rotational support portion of the invention. One end of the rotating shaft 33 is connected to the casing 23 and the other end of the rotating shaft 33 is connected to the gimbal motor 34. That is, the rotating shaft 33 is connected to the casing 23 of the gyro 2 and thus rotatably supports the gyro 2 around the rotating shaft 33 orthogonal to the rotating shaft 22 of the rotating body 21. Incidentally, the rotating shaft 33 is arranged extending vertically (i.e., in the height direction of the vehicle) so it rotates in the yaw direction. That is, the gyro 2 rotates in the yaw direction.

The gimbal motor 34 rotates the gyro 2 and thus may be regarded as a gyro rotating portion of the invention. The gimbal motor 34 is fixed to the vehicle 100 and rotates the rotating shaft 33 on which the clutch device 31 and the damper device 32 are arranged midway. That is, the gimbal motor 34 rotates the gyro 2 by rotating the casing on the rotating shaft 33 via the rotating shaft 33. The gimbal motor 34 is connected to the control apparatus 8 via the gimbal driver 10 and is controlled (i.e., driven) by the control apparatus 8. In this drive control, the gimbal motor 34 functions as a motor that rotates the gyro 2 using power that is supplied from the battery 11 by the gimbal driver 10.

The vehicle speed sensor 4 detects the vehicle speed of the vehicle 100. The vehicle speed sensor 4 may be regarded as a vehicle speed detecting portion of the invention. The vehicle speed sensor is connected to the control apparatus 8 and outputs a signal indicative of the vehicle speed V of the vehicle 100 to the control apparatus 8. The vehicle speed sensor 4 is arranged facing the driveshaft 103, for example, and optically or dynamically detects the amount of displacement of the driveshaft 103 around its axis. Also, the vehicle speed sensor 4 may be a wheel speed sensor that is provided on each of the wheels. In this case, the control apparatus 8 calculates the vehicle speed V of the vehicle 100 based on the speed of each wheel as detected by the wheel speed sensors provided on the wheels.

The steering angle sensor 5 detects the steering amount of the vehicle 100. The steering angle sensor 5 may be regarded as a steering amount detecting portion of the invention. In this example embodiment, the steering angle sensor 5 detects the steering angle as the steering amount of the vehicle 100. The steering angle sensor 5 is connected to the control apparatus 8 and outputs a signal indicative of the steering angle θ of the vehicle, which is the detected steering amount of the vehicle 100, to the control apparatus 8. The steering angle sensor 5 is arranged facing a steering arm of the steering apparatus 105, for example, and optically or dynamically detects the amount of displacement of the steering arm about its axis.

The rotating body sensor 6 detects the rotation speed of the rotating body 21 (hereinafter also referred to as the "rotating body rotation speed"), and thus may be regarded as a rotating body detecting portion of the invention. The rotating body sensor 6 is connected to the control apparatus 8 and outputs a signal indicative of the detected rotation speed ω of the rotating body 21 to the control apparatus 8. The rotating body sensor 6 is arranged facing the rotating shaft 22, for example, and optically or dynamically detects the amount of rotational displacement of the rotating shaft 22.

The gyro sensor 7 detects the rotation speed of the gyro 2 (hereinafter also referred to as the "gyro rotation speed"), and thus may be regarded as the gyro rotation speed detecting portion of the invention. The gyro sensor 7 is connected to the control apparatus 8 and outputs a signal indicative of the detected rotation speed of the gyro 2. Here, the gyro sensor 7 is arranged facing the rotating shaft 33, for example, and optically or dynamically detects the amount of rotational displacement of the rotating shaft 33.

The control apparatus 8 controls the vehicle behavior control apparatus 1. More specifically, the control apparatus 8 controls the rotation speed of the rotating body 21, as well as the rotation speed of the gyro 2. As shown in FIG. 2, the control apparatus 8 receives various input signals from various sensors mounted in various locations around the vehicle 100 provided with the vehicle behavior control apparatus 1. Examples of these input signals include the signal indicative of the vehicle speed of the vehicle 100 as detected by the vehicle speed sensor 4, the signal indicative of the steering angle of the vehicle 100 as detected by the steering angle sensor 5, the signal indicative of the rotation speed of the rotating body 21 as detected by the rotating body sensor 6, and the signal indicative of the rotation speed of the gyro 2 as detected by the gyro sensor 7, and the like.

The control apparatus 8 outputs various output signals based on those input signals, a first rotating body rotation speed map that is based on the vehicle speed and the rotation speed of the rotating body 21, and a second rotating body rotation speed map that is based on the steering angle θ and the rotation speed ω of the rotating body 21. The first rotating body rotation speed map and the second rotating body rotation speed map are stored in a storing portion 83. Examples of output signals include a gyro drive control signal that controls (i.e., drives) the gyro 2 (i.e., the gyro motor/generator) via the gyro driver 9, an ON/OFF signal that controls the clutch device 31 on and off, and a gimbal drive control signal that controls (i.e., drives) the gimbal motor 34 via the gimbal driver 10.

Also, the control apparatus 8 includes an input/output portion (I/O) 81 that inputs the input signals and outputs the output signals, a processing portion 82, and the storing portion 83 that stores various maps such as the first rotating body rotation speed map and the second rotating body rotation speed map and the like. The processing portion 82 is formed by memory and a CPU (Central Processing Unit). The processing portion 82 has at least a rotating body calculating portion 84, a required gyro moment calculating portion 85, a gyro rotation speed calculating portion 86, a rotating body control portion 87, and a gyro rotation control portion 88. The processing portion 82 may also realize a vehicle behavior control method or the like carried out by the vehicle behavior control apparatus 1 by loading a program that is based on a vehicle behavior control method or the like by the vehicle behavior control apparatus 1 into memory and executing it. Also, the storing portion 83 is formed of nonvolatile memory such as flash memory, memory that is able to read only, such as ROM (Read Only Memory), or memory that is able to read and write, such as RAM (Random Access Memory), or a combination of these.

The rotating body calculating portion 84 calculates the rotation speed of the rotating body 21 based on the detected vehicle speed and steering angle of the vehicle 100, the first rotating body rotation speed map, and the second rotating body rotation speed map.

The required gyro moment calculating portion 85 calculates the gyro moment that is to be generated, i.e., the required gyro moment, when the vehicle behavior control apparatus 1 controls the behavior of the vehicle 100 (hereinafter also simply referred to as "vehicle behavior"), i.e., performs vehicle behavior control in the yaw direction, the roll direction, and the pitch direction, which are the rotational directions of the vehicle. With the vehicle behavior control apparatus 1 according to this example embodiment, the required gyro moment calculating portion 85 calculates the gyro moment that is generated in the roll direction as the required gyro moment when controlling the vehicle behavior in the roll direction. This required gyro moment is calculated based on the vehicle speed as detected by the vehicle speed sensor 4, the steering angle as detected by the steering angle sensor 5, and the acceleration in the roll direction of the vehicle 100 as detected by an acceleration sensor, not shown, and the like.

Here, if the centrifugal force F of the rotating body 21 is the inertia moment I of the rotating body 21 and the rotating body 21 is a thin disc, the centrifugal force F of the rotating body 21 can be obtained by $F=I=\frac{1}{2}(mr^2)\omega$, which is an expression of the radius r, the mass m, and the rotating body rotation speed $\omega$. Accordingly, the gyro moment M that is generated by the vehicle behavior control apparatus 1 can be obtained by $M=F\times\Omega=\frac{1}{2}(mr^2)\omega\Omega$, which is an expression of the centrifugal force F of the rotating body 21 and the gyro rotation speed $\Omega$. That is, the gyro moment M is the product of the centrifugal force F and the gyro rotation speed $\Omega$, and is proportional to the product of the rotating body rotation speed $\omega$ and the gyro rotation speed $\Omega$. Therefore, the gyro rotation speed $\Omega$ can be reduced by increasing the rotating body rotation speed (o) in order to generate a constant gyro moment M.

The gyro rotation speed calculating portion 86 calculates the gyro rotation speed $\Omega$ of the gyro 2 based on the rotation speed $\omega$ of the rotating body 21 that was calculated by the rotating body calculating portion 84 and the required gyro moment Md that was calculated by the required gyro moment calculating portion 85. The gyro moment M is proportional to product of the rotating body rotating body $\omega$ and the gyro rotation speed $\Omega$ so the gyro rotation speed $\Omega$ can be obtained from the relational expression $\Omega=Md/\omega$ of the rotating body rotation speed to, the gyro rotation speed $\Omega$, and the required gyro moment Md. Incidentally, in this example embodiment, the gimbal 3 is provided with the damper device 32 so the gyro rotation speed $\Omega$ is preferably calculated with respect to the required gyro moment Md taking the transfer rate of the gyro torque into account.

The rotating body control portion 87 controls (i.e., drives) the rotating body 21 according to the rotating body rotation speed $\omega$ calculated by the rotating body calculating portion 84. The rotating body control portion 87 performs either rotation drive control or power generation drive control of the gyro 2 (i.e., the gyro motor/generator) via the gyro driver 9 based on the calculated rotating body rotation speed $\omega$ and the current rotating body rotation speed or detected by the rotating body sensor 6.

The gyro rotation control portion 88 controls (i.e., drives) the gyro 2 at the gyro rotation speed $\Omega$ calculated by the gyro rotation speed calculating portion 86. The gyro rotation control portion 88 performs drive control of the gimbal 34 via the gimbal driver 10 based on the calculated gyro rotation speed $\Omega$ and the current gyro rotation speed $\Omega r$ detected by the gyro sensor 7.

The gyro driver 9 drives the gyro 2 (i.e., the gyro motor/generator), and is connected to the gyro 2, the control apparatus 8, and the battery 11. The gyro driver 9 switches the connection state between the gyro 2 and the battery 11 according to the drive control of the control apparatus 8. When the control apparatus 8 performs rotation drive control of the gyro 2 (i.e., the gyro motor/generator), the gyro driver 9 drives the gyro 2 as a motor by supplying power from the battery 11 to the gyro 2 and rotating the rotating body 21 of the gyro 2. On the other hand, when the control apparatus 8 performs power generation drive control of the gyro 2 (i.e., the gyro motor/generator), the gyro driver 9 drives the gyro 2 as a generator by applying braking force to the rotating body 21 of the gyro 2 in the direction opposite the direction in which the rotating body 21 is rotating, thereby generating power which is then stored in the battery 11.

The gimbal driver 10 drives the gimbal motor 34 and is connected to the gimbal motor 34, the control apparatus 8, and the battery 11. When the control apparatus 8 performs drive control on the gimbal motor 34, the gimbal driver 10 drives the gimbal motor 34 to rotate the gyro 2 via the rotating shaft 33 by supplying power to the gimbal motor 34 from the battery 11.

The battery 11 is mounted in the vehicle 100. When an electric motor is mounted as a driving source in the vehicle 100, the battery 11 may also be used to supply power to the electric motor. Incidentally, the clutch device 31 may be connected to the battery 11 such that the ON/OFF control of the clutch device 31 may be performed according to power supplied from the battery 11.

Figure 3:
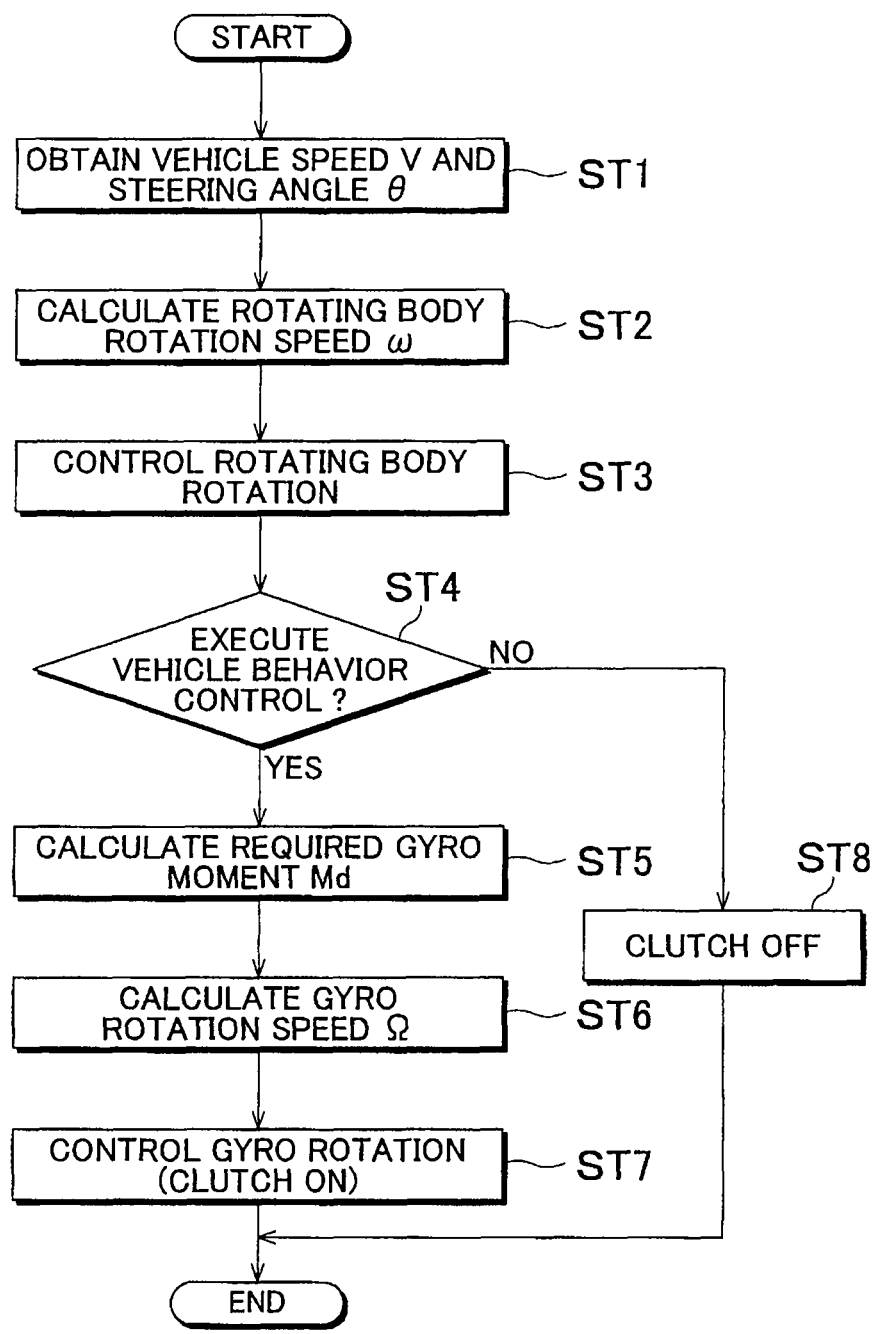
FIG. 3 is a flowchart illustrating a routine according to a vehicle behavior control method which is executed by the vehicle behavior control apparatus.
Figure 4:
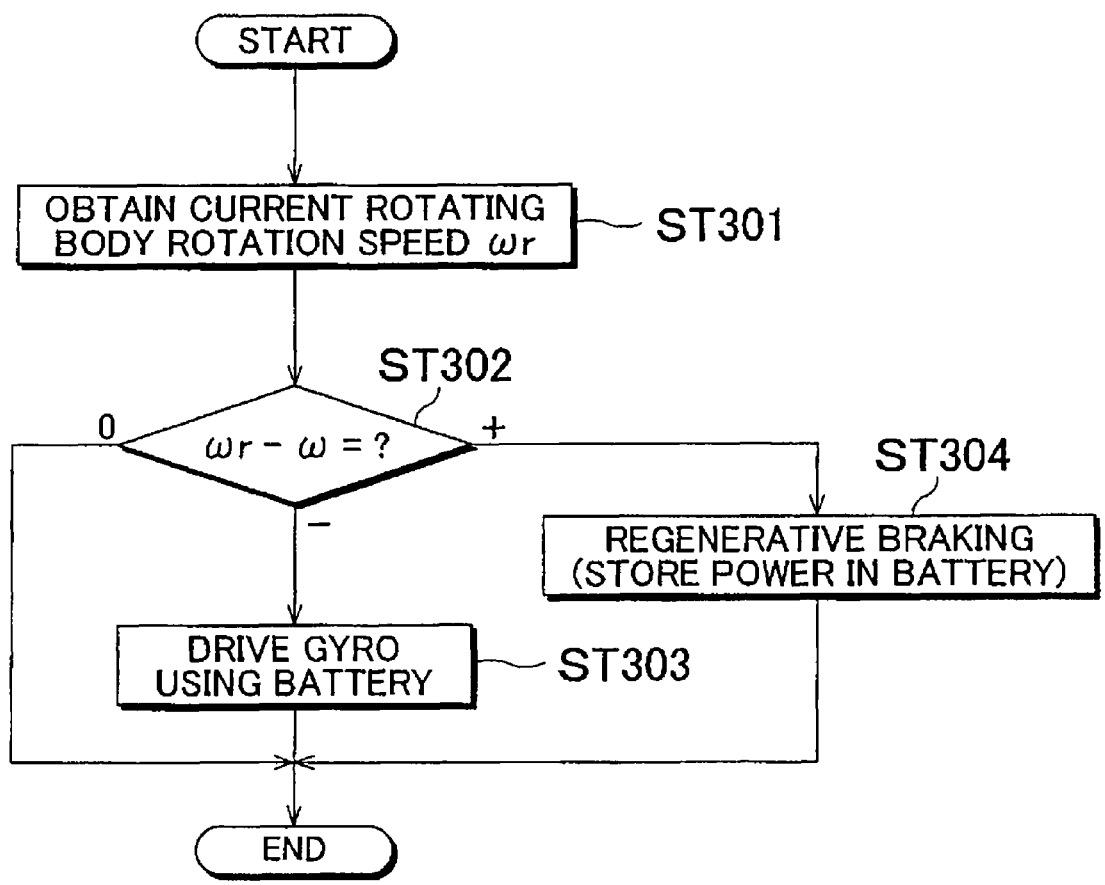
FIG. 4 is a flowchart illustrating a rotating body rotation control routine.
Figure 5:
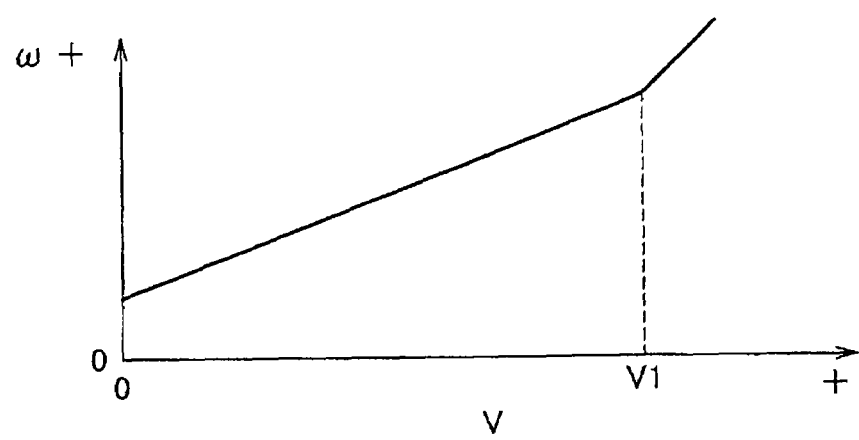
FIG. 5 is a view of an example of a first rotating body rotation speed map.
Figure 6:
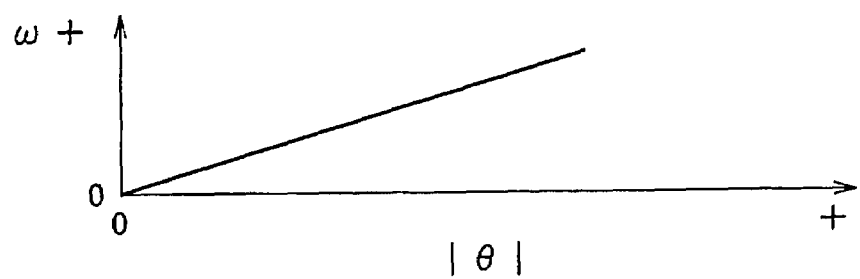
FIG. 6 is a view of an example of a second rotating body rotation speed map.
Figure 7:
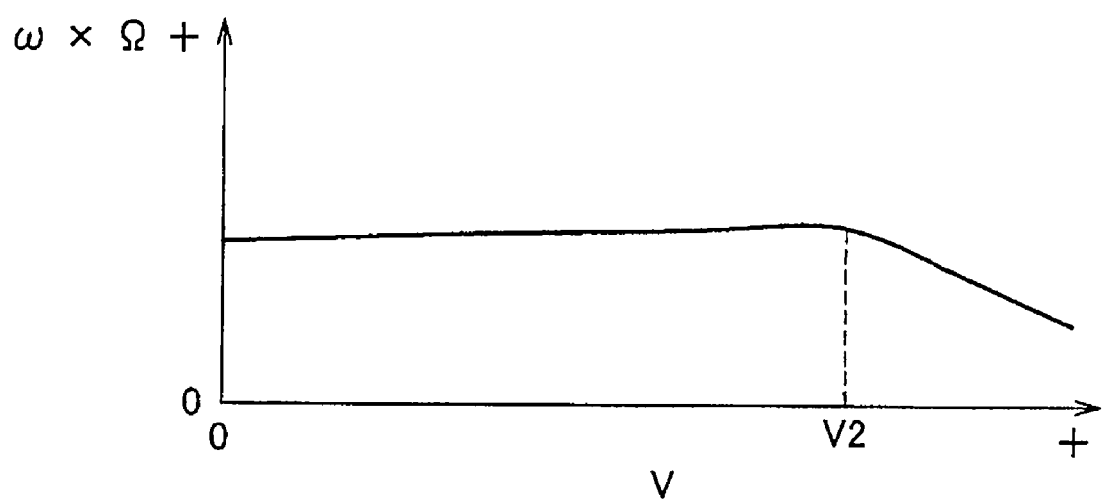
FIG. 7 is a graph showing the relationship between the vehicle speed and the product of the rotating body rotation speed and a gyro rotation speed.

Next, a vehicle behavior control method of the vehicle behavior control apparatus 1 will be described. FIG. 3 is a flowchart illustrating a routine according to a vehicle behavior control method which is executed by the vehicle behavior control apparatus. FIG. 4 is a flowchart illustrating a rotating body rotation control routine. FIG. 5 is a view of an example of the first rotating body rotation speed map, FIG. 6 is a view of an example of the second rotating body rotation speed map, and FIG. 7 is a graph showing the relationship between the vehicle speed and the product of the rotating body rotation speed and a gyro rotation speed. Incidentally, the routine according to the behavior control method which is executed by the vehicle behavior control apparatus 1 is executed at each control cycle of the vehicle behavior control apparatus 1. Hereinafter, an example of vehicle behavior control by the vehicle behavior control apparatus 1 will be described in a case where the vehicle 100 rolls in the direction opposite the direction (shown by arrow R in FIG. 1) in which the vehicle is turning (i.e., rolls clockwise), as shown in FIG. 1, such that the vehicle behavior changes in that roll direction. In this case, vehicle behavior control is executed by the vehicle behavior control apparatus 1 such that a gyro moment M is generated in the direction opposite the direction in which the vehicle 100 rolls (i.e., generated counterclockwise).

First, as shown in FIG. 3, the rotating body calculating portion 84 of the processing portion 82 of the control apparatus 8 obtains the vehicle speed V and the steering angle θ (i.e., step ST1). Here, the rotating body calculating portion 84 obtains the vehicle speed V detected by the vehicle speed sensor 4 and the steering angle θ detected by the steering angle sensor 5.

Next, the rotating body calculating portion 84 calculates the rotating body rotation speed $\omega$ (i.e., step ST2). Here, the rotating body calculating portion 84 calculates the rotating body rotation speed $\omega$ based on the obtained vehicle speed V and steering angle θ of the vehicle 100, the first rotating body rotation speed map which is based on the vehicle speed V and the rotating body rotation speed $\omega$ of the rotating body 21 and which is stored in the storing portion 83, and the second rotating body rotation speed map which is based on the steering angle θ and the rotating body rotation speed ω of the rotating body 21 and which is also stored in the storing portion 83.

The first rotating body rotation speed map is set such that the rotating body rotation speed ω increases as the vehicle speed V increases, as shown in FIG. 5. That is, the first rotating body rotation speed map is set so that the centrifugal force F of the rotating body 21 increases as the vehicle speed increases V. Accordingly, the rotating body calculating portion 84 calculates the rotating body rotation speed ω to be larger when the obtained vehicle speed V is high, i.e., when the vehicle 100 is traveling in the high speed region, than the rotating body rotation speed ω that is calculated when the vehicle 100 is traveling in the low speed region. Here, in the first rotating body rotation speed map according to this example embodiment, the rate of increase in the rotating body rotation speed ω is set to be constant when the vehicle speed V is between 0 and a predetermined value V1, and then increase when the vehicle speed V exceeds that predetermined value V1.

Also, the second rotating body rotation speed map is set such that the rotating body rotation speed to increases as the steering angle θ, in this case, the absolute value (|θ|) of the steering angle θ, increases. That is, the second rotating body rotation speed map is set such that the centrifugal force F of the rotating body 21 increases as the steering amount (i.e., the absolute value of the steering amount) of the vehicle 100 increases. Accordingly, the rotating body calculating portion 84 calculates a larger rotating body rotation speed ω when the obtained steering angle |θ| is large, i.e., when the vehicle 100 turns sharply. Accordingly, the centrifugal force F generated in the rotating body 21 is increased by increasing the rotating body rotation speed ω in advance as the steering angle θ, which is the steering amount, increases. That is, even if the behavior of the vehicle 100 suddenly changes in the roll direction from the vehicle 100 turning sharply, for example, the required gyro moment Md is generated with a low gyro rotation speed Ω. As a result, the vehicle behavior control apparatus 1 of this example embodiment improves the control response to the behavior of the vehicle 100 in the roll direction when the vehicle 100 turns sharply.

Here, the first rotating body rotation speed map according to this example embodiment may also be set such that the rate of increase in the rotating body rotation speed ω is constant as the vehicle speed V increases, or such that the rate of increase in the rotating body rotation speed ω decreases when the vehicle speed V exceeds the predetermined value V1. Also, the second rotating body rotation speed map according to this example embodiment is set such that the rate of increase in the rotating body rotation speed ω is constant as the steering angle θ increases. However, the second rotating body rotation speed map according to this example embodiment may also be set such that the rate of increase in the rotating body rotation speed ω increases when the steering angle θ exceeds a predetermined value, or such that the rate of increase in the rotating body rotation speed ω decreases when the steering angle θ exceeds a predetermined value.

Next, the rotating body control portion 87 controls the rotation of the rotating body 21 based on the rotating body rotation speed ω calculated by the rotating body calculating portion 84 (i.e., step ST3).

First, the rotating body control portion 87 obtains the current rotating body rotation speed ωr, as shown in FIG. 4 (i.e., step ST301). Here, the rotating body calculating portion 84 obtains the current rotation speed ωr of the rotating body 21 detected by the rotating body sensor 6 and output to the control apparatus 8.

Next, the rotating body control portion 87 compares the obtained current rotating body rotation speed our with the calculated rotating body rotation speed ω (i.e., step ST302). Here, the rotating body control portion 87 determines whether the difference of the obtained current rotating body rotation speed ωr minus the calculated rotating body rotation speed ω is 0, positive, or negative.

If it is determined that the difference of the current rotating body rotation speed ωr minus the calculated rotating body rotation speed ω is 0 (i.e., "0" in step ST302), the rotating body control portion 87 executes step ST4.

If it is determined that the difference of the current rotating body rotation speed ωr minus the calculated rotating body rotation speed ω is negative (i.e., "−" in step ST302), the rotating body control portion 87 drives the gyro 2 using the battery (i.e., step ST303). Here, the rotating body control portion 87 drives the gyro 2 (i.e., the gyro motor/generator) via the gyro driver 9 using the battery, i.e., performs rotation drive control. That is, the rotating body rotation control portion 87 supplies power from the battery 11 and drives the gyro 2 (i.e., gyro motor/generator) via the gyro driver 9 such that the obtained current rotating body rotation speed ωr comes to match the calculated rotating body rotation speed ω. As a result, the gyro 2 increases the rotation speed of the rotating body 21 to the calculated rotating body rotation speed ω. Incidentally, when the current rotating body rotation speed ωr reaches the calculated rotating body rotation speed ω, the difference of the current rotating body rotation speed ωr minus the rotating body rotation speed ω becomes 0 so the process proceeds on to step ST4.

Next, if the difference of the current rotating body rotation speed (or minus the calculated rotating body rotation speed w) is positive (i.e., "+" in step ST302), the rotating body control portion 87 applies regenerative braking to the gyro 2 (i.e., step ST304). Here, the rotating body control portion 87 performs regenerative braking on the gyro 2 (i.e., gyro motor/generator), i.e., power generation drive control, via the gyro driver 9. That is, the rotating body control portion 87 makes the gyro 2 (i.e., gyro motor/generator) generate power by applying braking force to the gyro 2 in the direction opposite the direction in which the rotating body 21 is rotating so that the obtained current rotating body rotation speed (or comes to match the calculated rotating body rotation speed ω. The power that is generated is then stored in the battery 11 via the gyro driver 9. Accordingly, the rotating body 21 is decelerated by the gyro 2 until its rotation speed matches the calculated rotating body rotation speed ω. Incidentally, when the current rotating body rotation speed ωr matches the calculated rotating body rotation speed ω, the difference of the current rotating body rotation speed ωr minus the rotating body rotation speed ω is 0 so the process proceeds on to step ST4.

In this way, the rotating body 21 rotates at the rotating body rotation speed ω. For example, the rotating body 21 rotates in the pitch direction of the vehicle 100 shown by arrow A, which is the direction in which the rotating body 21 rotates. As a result, centrifugal force F is generated in the rotating body 21. Therefore, the centrifugal force F of the rotating body 21 that is generated changes based on the vehicle speed V and the steering angle θ which is the steering amount. Here, the centrifugal force F of the rotating body 21 that is generated increases as the vehicle speed V increases or as the steering angle θ, i.e., the steering amount, increases. That is, when the obtained vehicle speed V is high, i.e., when the vehicle 100 is traveling in the high vehicle speed region, the rotating body 21 generates centrifugal force F that is greater than the centrifugal force F that is generated in the low vehicle speed region. Also, a large amount of centrifugal force F is also generated when the obtained steering angle |θ| is large, i.e., when the vehicle 100 is turning sharply.

Further, the gyro 2 is a gyro motor/generator. Accordingly, by making the gyro 2 function as a generator when decelerating the rotating body 21, power can be generated while decelerating the rotating body 21 by applying braking force in the direction opposite the direction in which the rotating body 21 is rotating. Accordingly, storing the generated power in the battery 11 enables the energy obtained during deceleration of the rotating body 21 to be used efficiently.

Also, because the gyro 2 is a gyro motor/generator, braking force in the direction opposite the rotating direction of the rotating body 21 can be applied when decelerating the rotating body 21. Accordingly, the centrifugal force generated in the rotating body 21 can be quickly reduced so the gyro moment M that can be generated can be quickly reduced. As a result, controllability of the vehicle behavior control using the gyro moment M can be improved.

Next, the control apparatus determines whether the vehicle behavior control is to be executed (i.e., step ST4). Here, the control apparatus 8 determines whether it is necessary to execute vehicle behavior control by the vehicle behavior control apparatus 1 for the current behavior of the vehicle 100 in the roll direction. The control apparatus 8 determines whether vehicle behavior control by the vehicle behavior control apparatus 1 is necessary based on factors that cause the behavior of the vehicle 100 to change in the roll direction, such as the steering angle θ of the vehicle 100 as detected by the steering angle sensor 5 and the acceleration of the vehicle 100 in the roll direction as detected by an acceleration sensor, not shown, for example. Incidentally, the vehicle speed V as detected by the vehicle speed sensor 4 may also be added to these two factors for determining whether vehicle behavior control needs to be executed by the vehicle behavior control apparatus 1. This is because even if the steering angle θ is the same, there may be a sudden change in the vehicle behavior in the roll direction of the vehicle 100, e.g., at least one of the front wheels 101R and 101L or rear wheels 102R and 101L may slip on the road surface, depending on the vehicle speed V of the vehicle 100.

Next, if it is determined that vehicle behavior control is to be executed by the control apparatus 8 (i.e., YES in step ST4), the required gyro moment calculating portion 85 calculates the required gyro moment Md (i.e., step ST5). Here, the required gyro moment calculating portion 85 calculates the required gyro moment Md, which is the gyro moment M to be generated in the roll direction for the current behavior of the vehicle 100 in the roll direction. The required gyro moment calculating portion 85 calculates the required gyro moment based on the vehicle speed V as detected by the vehicle speed sensor 4, the steering angle θ as detected by the steering angle sensor 5, and the acceleration of the vehicle 100 in the roll direction as detected by the acceleration sensor, not shown, and the like. For example, when the behavior of the vehicle 100 changes in the roll direction by the vehicle 100 making a left turn R, the required gyro moment calculating portion 85 calculates the required gyro moment Md so as to generate a gyro moment M in the direction opposite the direction in which the vehicle 100 is rolling.

Here, the required gyro moment calculating portion 85 calculates the required gyro moment Md so that it does not increase as the vehicle speed V detected by the vehicle speed sensor 4 increases. That is, the required gyro moment calculating portion 85 calculates the gyro moment M in the roll direction of the vehicle 100 so that it does not increase as the vehicle speed V detected by the vehicle speed sensor 4 increases. The required gyro moment calculating portion 85 calculates the required gyro moment Md so that the product of the gyro rotation speed Ω and the rotating body rotation speed ω that is proportional to the gyro moment M is constant while the detected vehicle speed V is between 0 and a predetermined value V2, and decreases when the detected vehicle speed V exceeds the predetermined value V2, as shown in FIG. 7, for example. That is the required gyro moment calculating portion 85 calculates the required gyro moment Md so that the generated gyro moment is either stable regardless of whether the detected vehicle speed V increases, or becomes smaller as the detected vehicle speed V increases. Accordingly, even if the vehicle speed V increases, the gyro moment M generated by the vehicle behavior control apparatus 1 will not increase. As a result, even if the behavior of the vehicle 100 in the roll direction suddenly changes, e.g., even if the required gyro moment Md drastically decreases after a sudden change from what it was before the sudden change, the gyro moment M that is generated will not increase. That is, the amount of gyro moment M generated with respect to the amount of control to generate the required gyro moment Md becomes smaller, thus enabling the control to be more accurate. In particular, when the vehicle 100 is traveling in a high speed region, the rotating body rotation speed is relatively increased, while the required gyro moment is not increased. Therefore, the gyro rotation speed that is generated by the gimbal 3 can be relatively small and accurate.

Next, the gyro rotation speed calculating portion 86 calculates the gyro rotation speed Ω (i.e., step ST6). Here, the gyro rotation speed calculating portion 86 calculates the gyro rotation speed Ω based on the calculated rotating body rotation speed ω and the calculated required gyro moment Md. The gyro rotation speed calculating portion 86 calculates the gyro rotation speed Ω according to the calculated rotating body rotation speed ω, the calculated required gyro moment Md, and the relational expression Ω=Md/ω, as described above. For example, when the behavior of the vehicle 100 in the roll direction changes by the vehicle 100 making a left turn and the rotating body 21 rotates in the pitch direction shown by arrow A, the gyro rotation speed calculating portion 86 calculates the gyro rotation speed Ω so that the rotating body 21 will rotate in the yaw direction, which is the direction of rotation of the rotating body 21, shown by arrow B in order to generate a gyro moment M in the direction opposite the direction in which the vehicle 100 is rolling as a result of making the left turn R.

Next, as shown by FIG. 3, the gyro rotation control portion 88 controls the rotation of the gyro 2 based on the gyro rotation speed Ω calculated by the gyro rotation speed calculating portion 86 (i.e., step ST7). Here, first, the control apparatus 8 performs ON/OFF control of the clutch device 31 to turn the clutch on. As a result, the gimbal motor 34 and the gyro 2 become connected and the gyro torque generated by the gimbal motor 34 is transmitted to the gyro 2. Next, the gyro rotation control portion 88 supplies power from the battery 11 to the gimbal motor 34 via the gimbal driver 10 so that the current gyro rotation speed Ωr (normally Ωr=0) detected by the gyro sensor 7 and output to the control apparatus 8 comes to match the calculated gyro rotation speed Ω. Accordingly, the gyro torque generated by the gimbal motor 34 is transmitted to the gyro 2 via the damper device 32 and the clutch device 31. As a result, the rotation speed of the gyro 2 comes to match the calculated gyro rotation speed Ω.

Accordingly, for example, when the behavior of the vehicle 100 in the roll direction is changing due to the vehicle 100 making a left turn R, as shown in FIG. 1, the gyro rotation speed calculating portion 86 rotates the rotating body 21 at the rotating body rotation speed ω in the pitch direction shown by arrow A and rotates the gyro 2 at the gyro rotation speed Ω in the yaw direction shown by arrow B such that the calculated required gyro moment Md is generated as the gyro moment M in the direction opposite the direction in which the vehicle 100 will roll, and that gyro moment M is applied to the vehicle 100. Therefore, excessive rolling for example can be suppressed by the vehicle behavior control performed by the vehicle behavior control apparatus 1.

Also, if it is determined that vehicle behavior control is not to be executed (i.e., NO in step ST4), the control apparatus 8 turns the clutch off by performing ON/OFF control of the clutch device 31 (i.e., step ST8). That is, the control apparatus 8 disconnects the gimbal motor 34 from the gyro 2 so that gyro torque generated by the gimbal motor 34 is not transmitted to the gyro 2. Accordingly, the transfer rate becomes 0 so even if the rotating body 21 and the gyro 2 rotate, the gyro moment M is not generated. As a result, with the vehicle behavior control apparatus 1 according to this example embodiment, the clutch device 31 and the damper device 32 change the transfer rate of the gyro torque that is transmitted to the gyro 2 so the gyro moment M that is generated can be suppressed. Accordingly, the vehicle behavior control apparatus 1 according to this example embodiment improves the controllability of vehicle behavior control by the gyro moment M.

In this way, when the vehicle speed V increases, i.e., when the vehicle 100 is traveling in the high speed region, the rotating body rotation speed ω of the rotating body 21 is increased so the centrifugal force F increased, i.e., the centrifugal force F of the rotating body 21 is changed in advance according to the vehicle speed V. Accordingly, when the vehicle 100 is traveling in the high speed region, the gyro moment M, which is the required gyro moment Md, can be generated without increasing the rotating body rotation speed ω of the rotating body 21 according to the magnitude of the required gyro moment Md in order to generate the required gyro moment Md. As a result, when the vehicle 100 is traveling in the high speed region, the vehicle behavior control apparatus 1 according to this example embodiment improves the control response of the control of the behavior of the vehicle 100 in the roll direction by the gyro moment M.

Also, as described above, when the vehicle speed V increases, i.e., when the vehicle 100 is traveling in the high speed region, the centrifugal force F of the rotating body 21 is increased in advance so that it is higher than it is when the vehicle is traveling in the low speed region. Accordingly, a sufficient gyro moment M can still be generated even if the gyro rotation speed Ω of the gyro 2 is low. That is, when the vehicle 100 is traveling in the high speed region, the gyro rotation speed Ω at which the gyro 2 is rotated can be reduced with respect to the required gyro moment Md. Accordingly, the driving amount of the gimbal motor 34 for generating the required gyro moment Md can be reduced when the vehicle is traveling in the high speed region so even if the behavior of the vehicle 100 in the roll direction suddenly changes due to one or more of the front wheels 101R and 101L or the rear wheels 102R and 102L slipping on the road surface, for example, a gyro moment M can be generated to follow the required gyro moment Md that suddenly changes due to a sudden change in vehicle behavior. As a result, the vehicle behavior control apparatus 1 according to this example embodiment improves the control response of the vehicle behavior control by the gyro moment M.

Further, the rotating body rotation speed ω of the rotating body 21 increases as the vehicle speed V increases so the rotating body rotation speed ω when the vehicle 100 is traveling in the low speed region is smaller than the rotating body rotation speed ω when the vehicle 100 is traveling in the high speed region. Accordingly, noise produced by the rotation of the rotating body 21 that is generated when the vehicle 100 is traveling in the low speed region can be suppressed. As a result, the vehicle behavior control apparatus 1 according to the invention enables noise from the rotation of the rotating body 21 to be suppressed.

Incidentally, the vehicle behavior control method of the vehicle behavior control apparatus according to the invention is not limited to the vehicle behavior control method of the vehicle behavior control apparatus 1 according to this example embodiment. For example, when the vehicle 100 makes a left turn R and consequently rolls in the direction opposite the direction in which the vehicle is turning (i.e. rolls clockwise), the behavior of the vehicle 100 in the roll direction changes, as shown in FIG. 1. In this case, the vehicle behavior control by the vehicle behavior control apparatus 1 may also generate a gyro moment M in the same direction as the direction in which the vehicle 100 is rolling (i.e., clockwise). In this case, the gyro moment M is actively generated in the roll direction when the vehicle 100 makes a left turn R, which increases the ground contact pressure of the right front wheels 101R and the right rear wheel 102R thereby improving turnability. Also, the vehicle behavior control apparatus 1 can also control the behavior of the vehicle 100 in the pitch direction by, for example, arranging the rotating shaft 22 in the vehicle length direction and basically rotating the rotating body 21 in the roll direction, and arranging the rotating shaft 33 in the vehicle height direction and basically rotating the gyro 2 in the yaw direction. Further, the vehicle behavior control apparatus 1 can also control the behavior of the vehicle 100 in the yaw direction by, for example, arranging the rotating shaft 22 in the vehicle width direction and basically rotating the rotating body 21 in the pitch direction, and arranging the rotating shaft 33 in the vehicle length direction and basically rotating the gyro 2 in the roll direction.

Moreover, the vehicle behavior control apparatus 1 according to the foregoing example embodiment is provided with rotating shaft 33 of the gimbal 3 and the gimbal motor 34, but the invention is not limited to this, i.e., the rotating shaft 33 of the gimbal 3 and the gimbal motor 34 may be omitted. That is, the gyro 2 may be fixed to the vehicle so that the rotating shaft 22 extends in the vehicle width direction. In this case, when the vehicle 100 rolls in one roll direction as a result of the vehicle 100 making a left turn R, gyro rotation speed is generated around the longitudinal axis of the vehicle so a gyro moment M in the other roll direction can be generated in the rotating body 21. Accordingly, if the rotating body rotation speed ω of the rotating body 21 is increased so that the centrifugal force F is increased, i.e., if the centrifugal force F of the rotating body 21 is increased in advance according to the vehicle speed V, when the vehicle speed V increases, i.e., when the vehicle 100 is traveling in the high speed region, then the gyro moment M which is the required gyro moment Md can be generated without increasing the rotating body rotation speed ω of the rotating body 21 according to the magnitude of the required gyro moment Md in order to generate the required gyro moment Md when the vehicle 100 is traveling in the high speed region. As a result, the vehicle behavior control apparatus 1 according to this example embodiment improves the control response of the control of the behavior of the vehicle in the roll direction using the gyro moment M when the vehicle 100 is traveling in the high speed region.

Also, in the vehicle behavior control apparatus 1 according to the foregoing example embodiment, the clutch device 31 is only controlled to be either on or off, i.e., gyro torque generated by the gimbal motor 34 is either transmitted or not transmitted (i.e., a transfer rate of either 1 or 0), but the invention is not limited to this. That is, the transfer rate may be controlled as appropriate. Incidentally, the clutch device 31 may also be a direct-current motor, in which case the transfer rate can be reduced by not providing power.

Also, in the vehicle behavior control apparatus 1 according to the foregoing example embodiment, the gyro 2 (i.e., the gyro motor/generator) is used as the braking force applying portion, but the invention is not limited to this. For example, a brake device such as an electromagnetic brake or a hydraulic brake may also be used.

Further, in the vehicle behavior control apparatus 1 according to this example embodiment, the gimbal 3 is provided with the clutch device 31 and the damper device 32, but the invention is not limited to this. That is, the gimbal 3 may be provided with neither.

Also, in the vehicle behavior control apparatus 1 according to the foregoing example embodiment, the steering sensor 4 is provided as the steering amount detecting portion, but the invention is not limited to this. That is, a steering speed sensor that detects the steering speed instead of the steering angle of the vehicle 100 may instead be used as the steering amount detecting portion.

Also, in the vehicle behavior control apparatus 1 according to the foregoing example embodiment, the vehicle 100 may also be provided with a regenerative brake device 110 that brakes (or performs regenerative braking to) the wheels of the vehicle 100 (FIG. 1). When regenerative braking is performed by this regenerative brake device, the regenerative brake device generates power and stores that power in a battery, not shown, for storing regenerative power such as a battery that drives an electric motor that is a driving source. Here, when the battery is fully charged, the regenerative brake device is unable to perform regenerative braking because it can not consume regenerated power. Therefore, the regenerative brake device may be connected to the gyro 2 via the gyro driver 9 and at least some of the regenerative power generated by the regenerative brake device may be used to drive the gyro 2. In this case, even if the battery that stores the regenerative power is fully charged, the gyro 2 consumes regenerative power generated by the regenerative brake device so regenerative braking can still be performed by the regenerative brake device. Accordingly, during regenerative braking, braking performance of the vehicle is improved even if the battery is fully charged.

As described above, the vehicle control device according to the invention is useful as a vehicle control device for controlling the behavior of a vehicle in a direction of rotation, and is particularly suited for suppressing noise and/or improving control response.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A vehicle behavior control apparatus that generates a gyro moment based on the behavior of the vehicle, comprising:
    a gyro that includes:
        a rotating body which is rotatably supported on a first rotating shaft, and
        a rotating body rotating portion that rotates the rotating body;
    a vehicle speed detecting portion that detects a vehicle speed of the vehicle;
    a controller configured to increase or decrease centrifugal force generated in the rotating body based on the detected vehicle speed;
    a gimbal, the gimbal including a gyro rotational support portion that rotatably supports the gyro on a second rotating shaft that is orthogonal to the first rotating shaft of the rotating body, and a gyro rotating portion that rotates the gyro; and
    a transfer rate changing portion that changes a transfer rate of gyro torque which rotates the gyro from the gyro rotating portion to the gyro.

2. The vehicle behavior control apparatus according to claim 1, wherein the controller increases the centrifugal force generated in the rotating body as the detected vehicle speed increases.

3. The vehicle behavior control apparatus according to claim 1, wherein the controller includes:
    a rotating body calculating portion that calculates a rotation speed of the rotating body based on the vehicle speed, and
    a rotating body control portion that rotates the rotating body such that the rotation speed of the rotating body matches the rotation speed calculated by the rotating body calculating portion to change the centrifugal force.

4. The vehicle behavior control apparatus according to claim 3, further comprising a steering amount detecting portion that detects a steering amount of the vehicle,
    wherein the rotating body rotating portion increases the rotation speed of the rotating body to increase the centrifugal force as the detected steering amount increases.

5. The vehicle behavior control apparatus according to claim 1, wherein the controller generates either a gyro moment that is constant regardless of an increase in the detected vehicle speed or a gyro moment that decreases as the detected vehicle speed increases.

6. The vehicle behavior control apparatus according to claim 1, wherein the transfer rate changing portion includes at least either a clutch device or a damper device.

7. The vehicle behavior control apparatus according to claim 1, further comprising a braking force applying portion that applies braking force to the rotating body in a direction opposite the direction in which the rotating body rotates.

8. The vehicle behavior control apparatus according to claim 1, wherein the rotating body rotating portion includes a gyro motor/generator,
    wherein the vehicle behavior control apparatus further includes a battery that is connected to the gyro motor/generator,
    wherein the gyro motor/generator generates power when the rotating body decelerates and stores the generated power in the battery.

9. The vehicle behavior control apparatus according to claim 8, wherein the gyro motor/generator includes a braking force applying portion that applies braking force to the rotating body in a direction opposite the direction in which the rotating body rotates.

10. The vehicle behavior control apparatus according to claim 1, further comprising a regenerative brake device that performs regenerative braking to a wheel of the vehicle,
    wherein at least some regenerative power that is generated when the regenerative braking is performed by the regenerative brake device is used to drive the rotating body rotating portion.

11. The vehicle behavior control apparatus according to claim 1, wherein the controller includes a storing portion that stores a first map defining a relationship between the vehicle speed and the rotation speed of the rotating body, the relationship being such that the rotation speed of the rotating body increases as the vehicle speed increases, wherein a rotating body calculating portion calculates the rotating body rotation speed based on the detected vehicle speed and the first map.

12. The vehicle behavior control apparatus according to claim 11, further comprising a steering amount detecting portion that detects a steering amount of the vehicle, wherein the storing portion also stores a second map defining a relationship between the steering amount of the vehicle and the rotation speed of the rotating body, the relationship being such that the rotation speed of the rotating body increases as the steering amount increases, and wherein the rotating body calculating portion calculates the rotating body rotation speed based on the detected steering amount and the second map.

13. The vehicle behavior control apparatus according to claim 1, wherein the controller includes:
a required gyro moment calculating portion that calculates a required gyro moment based on the detected vehicle speed, the required gyro moment either being constant regardless of an increase in the detected vehicle speed or decreasing as the detected vehicle speed increases,
a gyro rotation speed calculating portion that calculates a gyro rotation speed at which the gyro rotates on the second rotating shaft, based on the required gyro moment calculated by the required gyro moment calculating portion and the rotating body rotation speed calculated by a rotating body calculating portion, and
a gyro control portion that controls, based on the gyro rotation speed calculated by the gyro rotation speed calculating portion, the gyro rotating portion to rotate the gyro on the second rotating shaft.

14. The vehicle behavior control apparatus according to claim 13, further comprising a steering angle detecting portion that detects a steering angle of the vehicle, wherein the controller determines whether to execute vehicle behavior control based on at least one of the steering angle detected by the steering angle detecting portion and the vehicle speed detected by the vehicle speed detecting portion, and rotates the gyro on the second rotating shaft only when it is determined that vehicle behavior control is to be executed.

15. A vehicle behavior control method comprising:
detecting a vehicle speed;
calculating a rotation speed of a rotating body, which is part of a gyro and rotates on a first rotating shaft, such that the calculated rotating body rotation speed increases or decreases based on the detected vehicle speed;
rotating the rotating body such that the rotation speed of the rotating body matches the calculated rotation speed;
calculating a required gyro moment based on the detected vehicle speed;
calculating, based on the calculated required gyro moment and the calculated rotation speed, a gyro rotation speed at which the gyro rotates on a second rotating shaft which is orthogonal to the first rotating shaft;
rotating the gyro on the second rotating shaft such that the gyro rotation speed comes to match the calculated gyro rotation speed; and
changing a transfer rate of gyro torque which rotates the gyro from a gyro rotating portion to the gyro.

16. The vehicle behavior control method according to claim 15, wherein the calculated rotating body rotation speed is calculated to increase as the detected vehicle speed increases.

17. The vehicle behavior control method according to claim 15, further comprising:
detecting a steering angle of the vehicle;
determining whether to execute vehicle behavior control based on at least one of the detected steering angle and the detected vehicle speed; and
rotating the gyro on the second rotating shaft only when it is determined that the vehicle behavior control is to be executed.

18. A vehicle behavior control apparatus that generates a gyro moment based on the behavior of the vehicle, comprising:
a gyro that includes:
a rotating body which is rotatably supported on a first rotating shaft, and
a rotating body rotating portion that rotates the rotating body;
a vehicle speed detecting means for detecting a vehicle speed of the vehicle;
a control means for increasing or decreasing centrifugal force generated in the rotating body based on the detected vehicle speed;
a gimbal, the gimbal including a gyro rotational support portion that rotatably supports the gyro on a second rotating shaft that is orthogonal to the first rotating shaft of the rotating body, and a gyro rotating portion that rotates the gyro; and
a transfer rate changing portion that changes a transfer rate of gyro torque which rotates the gyro from the gyro rotating portion to the gyro.

* * * * *